Oct. 7, 1969    D. G. PERKINS    3,471,637
COLOUR TELEVISION CAMERA LAYOUT
Filed May 5, 1966    3 Sheets-Sheet 1

Oct. 7, 1969  D. G. PERKINS  3,471,637
COLOUR TELEVISION CAMERA LAYOUT
Filed May 5, 1966  3 Sheets-Sheet 2

›
United States Patent Office 3,471,637
Patented Oct. 7, 1969

3,471,637
COLOUR TELEVISION CAMERA LAYOUT
Denis Gordon Perkins, Gerrards Cross, England, assignor to Electric & Musical Industries Limited, Hayes, Middlesex, England, a company of Great Britain
Filed May 5, 1966, Ser. No. 547,865
Claims priority, application Great Britain, May 11, 1965, 19,764/65
Int. Cl. G04n 9/08
U.S. Cl. 178—5.4   9 Claims

ABSTRACT OF THE DISCLOSURE

In a colour television camera the part of the case which includes the pick-up tubes has a substantially rectangular cross section and a zoom lens is mounted at the front thereof, the zoom lens being carried on a base formed by a part of the case which projects forward from said first part. A prism assembly is mounted in the first mentioned part of the case so that the beam emerging from the zoom lens is incident on the assembly and is divided thereby into at least three beams, which diverge from the axis of the incident beam toward the vicinity of respective longitudinal edges of the case, the pick-up tubes being disposed to receive the diverging beams, and having their axes at least approximately co-linear with the respective diverging beams. For a four tube camera, the four beams when viewed along the axis of the incident beam are substantially symmetrical, the prism assembly being in a central position. The diverging beams diverge from the axis of the incident beam at angles of more than 45° so that the projection of the tubes in the direction of the axis of the incident beam is relatively small.

---

This invention relates to colour television cameras of the kind which employ at least three camera tubes. For example, such a camera may employ four camera tubes which serve to provide signals corresponding to the red, blue, and green components and to the brightness component respectively of a scene.

In designing a colour television camera, one problem which is encountered is that of producing a camera of reasonable size which can easily be manipulated. In such a camera, three or four, pick-up tubes and their associated scanning circuits and head amplifiers have usually to be accommodated, and it is now customary to attach a zoom lens, itself bulky, to the camera. The light emerging from the zoom lens is passed to light splitting means for dividing the light into the appropriate number of beams of different spectral compositions and the practice has usually been for one of the beams to be formed by light passing straight through the light splitting means. The pick-up tube for receiving this light is usually located with its axis co-linear with the axis of the lens and the light splitting means, resulting in a camera of considerable overall length. Relay lens systems have also been proposed for introduction between the beams emerging from the light splitting means and the pick-up tubes. Such lenses lead to loss of light, problems of adjustment and other difficulties, and occupy substantial space.

The object of the present invention is to provide an improved colour television camera with a view to providing a camera of compact construction.

According to the present invention there is provided a colour television camera including a case of which at least part is of substantially rectangular cross section, light splitting means for dividing the incident light beam into at least three light beams of different spectral compositions, each of the light beams diverging from the axis of the incident light beam toward the vicinity of respective longitudinal edges of said case part, and camera tubes disposed in said case part to receive the diverging beams, said tubes having their axes at least approximately co-linear with those of the respective divergent beams.

Figure 1:
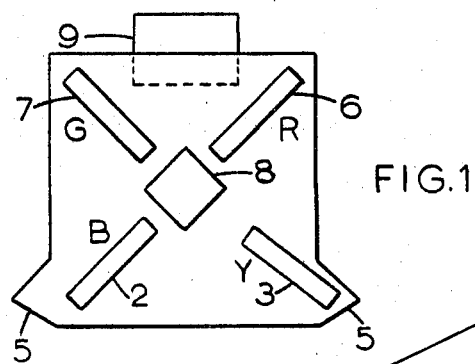
Figure 2:
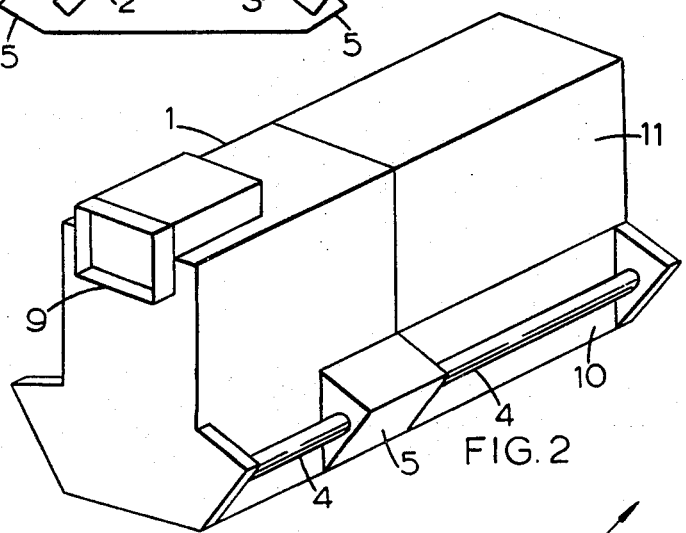

In order that the invention may be clearly understood and readily carried into effect it will now be described by way of example with reference to the accompanying drawings, in which:

FIGURE 1 illustrates a cross-section through a camera according to the invention viewed from the front,
FIGURE 2 illustrates in perspective the camera illustrated in FIGURE 1, and
FIGURES 3, 4, 5, 6 and 7 are drawings of the prism arrangement used in the camera.

Referring to FIGURES 1 and 2, the camera case is indicated by the reference numeral 1, and as shown is basically rectangular in cross-section with projections 5 at the two lower edges to allow for the ends of the two lower camera tubes 2 and 3 and their associated equipment, for example coils and screens, to project beyond the boundaries of the rectangle. The projections provide convenient mounts for carrying handles 4 for the camera. The camera tubes for the brightness components and the red, green and blue components 3, 6, 7 and 2 respectively, are mounted approximately in a vertical plane in a radial manner, the targets of the tubes facing to the centre where there is mounted an optical system 8 which serves to direct appropriate portions of the light incident from the scene being televised to the relevant camera tube. The optical system 8 will be described below. In the space between the two top camera tubes 6 and 7, there is provided a view finder 9. The case projects forward as shown at 10 and part of the associated circuits for the camera are arranged inside this portion which serves also as a base to carry a zoom lens assembly 11. Further parts of the circuits are arranged in the main portion of the case to the rear of the camera tubes.

In an alternative design of camera according to the invention only one of the tubes 2, 3 projects beyond the boundaries of the rectangular and projection 5 is provided only on the side occupied by that tube. The projection is extended beyond the region occupied by the tube and is conveniently used as a housing for the entry of the camera cable.

Figure 3:
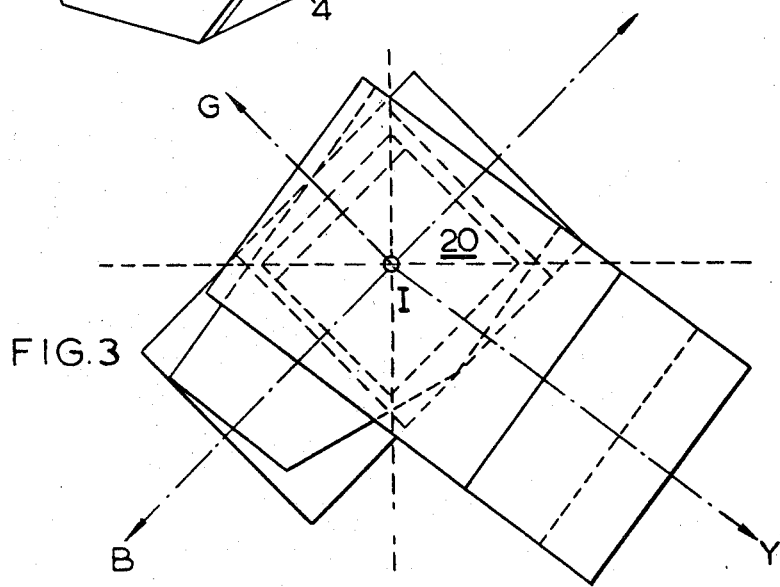
Figure 4:
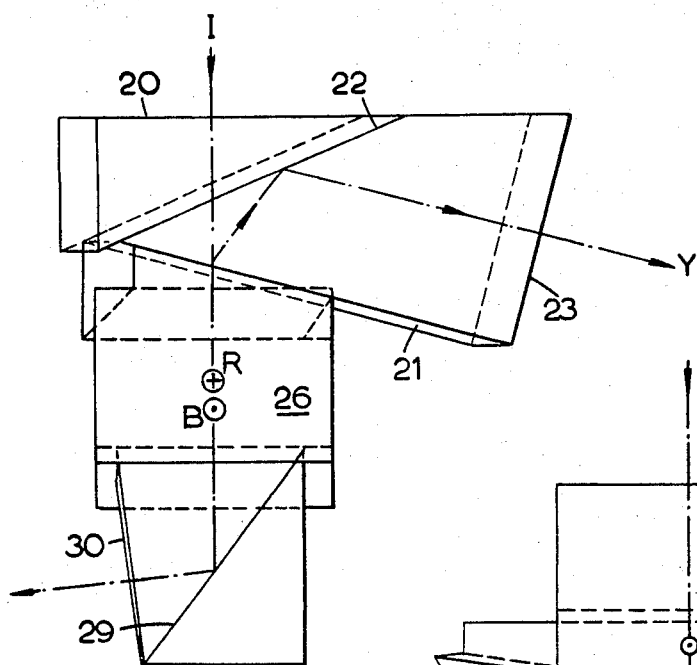
Figure 5:
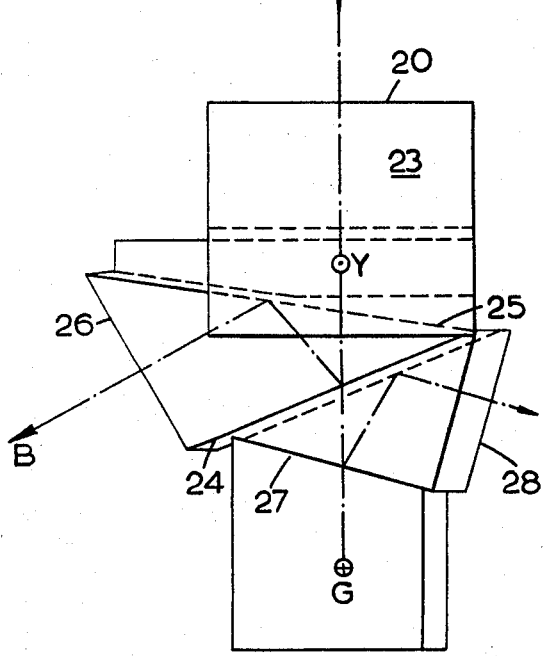
Figure 6:
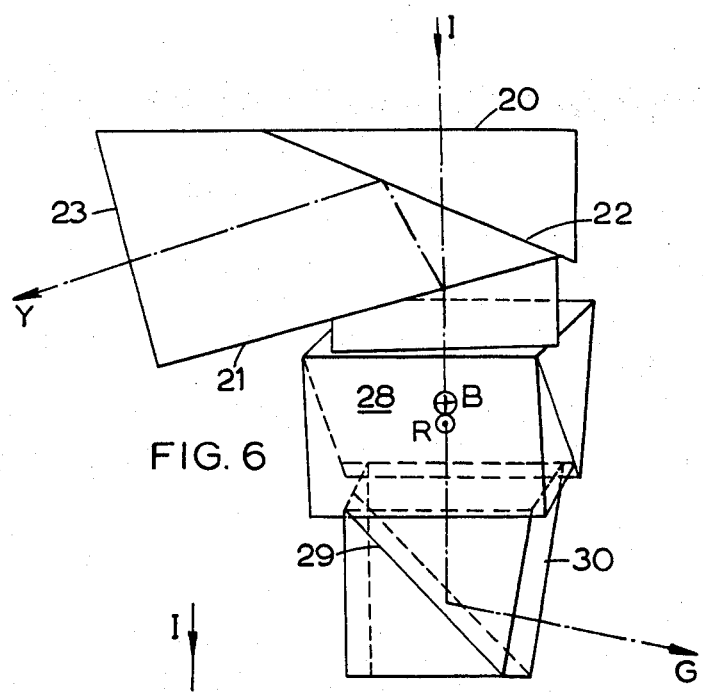
Figure 7:
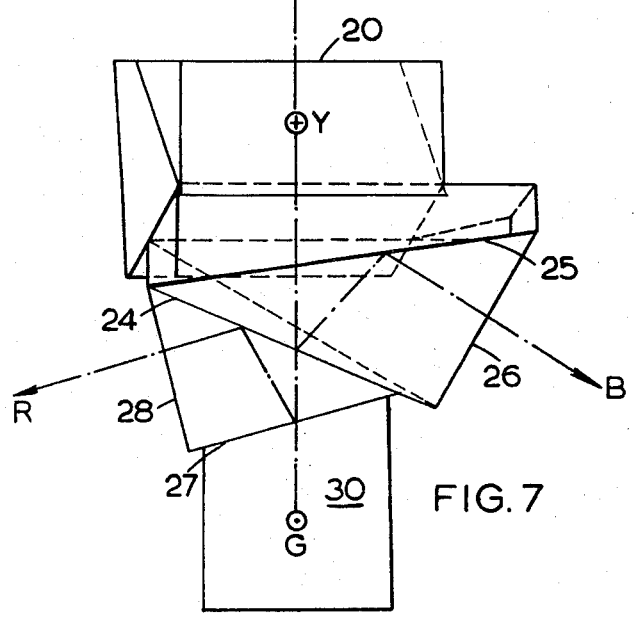

The optical system 8 consists of an assembly of prisms separated by various air gaps and having dichloric filters mounted on some surfaces. FIGURE 3 is a drawing of the system as viewed from the front of the camera. In this and subsequent figures beams of light which are perpendicular to the plane of the drawing are indicated by dots or crosses within circles which indicate beams emerging towards the observer or beams receding from the observer respectively. The incident light enters the system as indicated at I and as shown the red, green and blue components of the light for the brightness component camera tube, that is R, G, B and Y components, emerge in four different directions approximately in a plane perpendicular to the incident beam. The R, G and B beams are all at angles of 45° to the horizontal but the Y beam is inclined to the horizontal by an angle of 37°. As will be seen subsequently the Y beam has an axial path length in the system which is shorter than that of the other beams and consequently the Y camera tube must be mounted at a greater distance from the initial optical axis than the other tubes. This greater distance can be more readily accommodated if the tube is tilted slightly away from the 45° position which would make it symmetrical with the other tubes to the 37° position already mentioned and its end moved into the projection 5.

The construction and operation of the optical system will become apparent from FIGURES 4, 5, 6 and 7 which show views of the system shown in FIGURE 3 as viewed from directions which are projections of the directions of emergence of the B, Y, R and G beams respectively on a plan perpendicular to the initial optical axis.

The incident light I enters the system at the surface 20 and a portion of the beam is reflected at the surface 21 which is partially silvered so that a portion of the beam is reflected and the remainder transmitted. Alternatively said surface 21 may be dichroic and the spectral composition of the transmitted light may thus be arranged to have a desired composition. The reflected portion is again reflected at the surface 22 where there is a small air gap and the angle of incidence is such that total internal reflection occurs, and the beam emerges at the surface 23 to constitute the Y component. The surface 24 is dichoric so that it reflects the blue component of the beam and transmits the remainder of the light. The blue component of the beam is reflected at the surface 25 which like the surface 22 has a small air gap so that reflection occurs and the B componetnt emerges at the surface 26. The remainder of the beam encounters the dichoric surface 27 where the red component is reflected and the green component transmitted. The red component is reflected at the surface 24 which has an air gap like that of 22 and emerges at the surface 28, and the green component is reflected at the surface 29 which is silvered and emerges at the surface 30.

It will be seen from the drawings that the emergent beams are tilted towards the rear of the camera by 30° in the case of the B beam, and lesser amounts in the case of the other three beams, and consequently the camera tubes would be required to be similarly disposed.

In the camera described above the axes of all the pick-up tubes are differently inclined, and the effect of the earth's magnetic field is different on each of the tubes. Thus, if the registration between the tubes is correct with the camera pointing in one direction, when the camera is rotated so ase to point in a different direction the effect of the earth's magnetic field will change in a different manner for each of the tubes and will lead to upset the registration. To reduce this effect it is necessary to provide magnetic screening round each of the tubes. Preferably the screening comprises a double layer of magnetic material with an air space between the two layers since a double layer is found to give better magnetic screening than the same weight of material disposed in a single layer.

What I claim is:

1. A colour television camera including a case of which at least part is of substantially rectangular cross section, light splitting means for dividing the incident light beam into at least three light beams of different spectral compositions, each of the latter light beams diverging from the axis of the incident light beam toward the vicinity of respective longitudinal edges of said case part, and pick-up tubes disposed in said case part to receive the diverging beams, said tubes having their axes at least approximately co-linear with those of the respective divergent beams.

2. A colour television camera according to claim 1 in which said light splitting means is arranged to divide the incident light beam into four beams, which beams when viewed along the axes of the incident beam are substantially symmetrical.

3. A colour television camera according to claim 1 in which said divergent beams diverge from the axis of the incident beam at angles of more than 45° so that the projection of the tubes in the direction of the axis of the incident beam is relatively small.

4. A colour television camera according to claim 1 including a lateral extension to said case part at at least one of said longitudinal edges to accomodate the end of one of said pick-up tubes.

5. A colour television camera according to claim 4 in which said lateral extension is extended as a housing for the entry of the camera caple.

6. A colour television camera according to claim 1 including a camera view finder which projects between two of said pick-up tubes having their axes directed respectively toward the two uppermost longitudinal edges of said case part.

7. A colour television camera including a camera case having a zoom lens mounted at the front thereof, part of said case behind the zoom lens having a substantially rectangular cross section, light splitting means in said case part located to have incident on it the beam emergent from said lens and arranged to divide said incident beam into at least three light beams of different spectral compositions, each of said latter beams diverging from the axis of the incident beam toward the vicinity of respective longitudinal edges of said case part and pick-up tubes disposed to receive said divergent beams, said tubes having their axes at least substantially co-linear with those of the respective divergent beams and each of said divergent beams diverging at angles of more than 45° so that the projection of the tubes in the direction of the axis of said emergent beam is relatively small.

8. A colour television camera according to claim 7, and case including a part which projects forward from said first part and serves as a base to carry the zoom lens, circuit components of the camera being located in said forward projecting part.

9. A colour television camera according to claim 7 in which said light splitting means is arranged to divide the incident light beam into four beams, which when viewed along the axis of the incident beam are substantially symmetrical.

References Cited

UNITED STATES PATENTS

| | | | |
|---|---|---|---|
| 2,315,406 | 3/1943 | Eddy | 178—7.92 |
| 3,017,454 | 1/1962 | James et al. | 178—5.4 |
| 3,333,053 | 7/1967 | Back | 178—5.4 |

RICHARD MURRAY, Primary Examiner

U.S. Cl. X.R.
178—5.2